US008705088B2

(12) United States Patent
Sugawara (10) Patent No.: US 8,705,088 B2
(45) Date of Patent: Apr. 22, 2014

(54) IMAGE PROCESSING APPARATUS INCLUDING AN INPUT SECTION AND A GENERATING SECTION FOR PRINTING IMAGE DATA, PRINTING SYSTEM, AND COMPUTER READABLE MEDIUM

(75) Inventor: Masafumi Sugawara, Kanagawa (JP)

(73) Assignee: Fuji Xerox Co., Ltd., Tokyo (JP)

(*) Notice: Subject to any disclaimer, the term of this patent is extended or adjusted under 35 U.S.C. 154(b) by 619 days.

(21) Appl. No.: 12/695,194

(22) Filed: Jan. 28, 2010

(65) Prior Publication Data

US 2011/0051177 A1    Mar. 3, 2011

(30) Foreign Application Priority Data

Aug. 28, 2009  (JP) .................................. 2009-198252

(51) Int. Cl.
*G06F 3/12* (2006.01)
(52) U.S. Cl.
USPC ......... 358/1.15; 345/619; 358/1.13; 358/1.18
(58) Field of Classification Search
USPC ............... 358/1.13, 1.15, 1.18, 1.9, 403, 443;
101/137, 453, 463.1; 250/492.23;
270/1.01, 5.02; 283/117; 345/619;
347/5; 382/112; 399/49, 72; 400/62,
400/188, 76; 701/457
See application file for complete search history.

(56) References Cited

U.S. PATENT DOCUMENTS

| | | | |
|---|---|---|---|
| 4,674,856 A * | 6/1987 | Hyodo et al. ...................... 355/1 |
| 4,989,107 A | 1/1991 | Tsukahara |
| 5,257,120 A * | 10/1993 | Hirota ........................... 358/443 |
| 5,815,243 A | 9/1998 | Bailey et al. |
| 6,293,592 B1 * | 9/2001 | Robertson et al. ............. 283/117 |
| 6,594,034 B1 | 7/2003 | Bloomquist et al. |
| 6,655,862 B1 * | 12/2003 | Johnson ........................ 400/188 |
| 2001/0048529 A1 * | 12/2001 | Fotland .......................... 358/1.9 |
| 2003/0007167 A1 | 1/2003 | Catt et al. |
| 2006/0279798 A1 * | 12/2006 | Rudolph et al. ............... 358/403 |
| 2007/0217849 A1 * | 9/2007 | Handa et al. .................... 400/62 |

FOREIGN PATENT DOCUMENTS

| | | | | |
|---|---|---|---|---|
| EP | 0 529 403 A2 | 3/1993 | | |
| EP | 1 026 876 A2 | 8/2000 | | |
| EP | 1 258 828 A2 | 11/2002 | | |
| GB | 2 317 590 A | 4/1998 | | |
| JP | 62-022270 A | 1/1987 | | |
| JP | 62-123478 A | 6/1987 | | |
| JP | 01-116692 A | 9/1989 | | |
| JP | 2-295771 A | 12/1990 | | |
| JP | 2001113811 A * | 4/2001 | .............. B41L 13/04 | |
| WO | 01/25905 A1 | 4/2001 | | |

OTHER PUBLICATIONS

Excerpts from Postscript Language Reference, third edition, Adobe Systems Incorporated, 1999.*

* cited by examiner

*Primary Examiner* — David S Cammack
(74) *Attorney, Agent, or Firm* — Sughrue Mion, PLLC (57) ABSTRACT

An image processing apparatus includes an input section that inputs image information and additional information; and a generating section that, in case that printing of a mirror image of an image according to the image information and a normal image of an image according to the additional information is instructed, generates printing image information for printing the mirror image of the image according to the image information input from the input section, and the normal image of the image according to the additional information input from the input section.

10 Claims, 6 Drawing Sheets

IMAGE PROCESSING APPARATUS INCLUDING AN INPUT SECTION AND A GENERATING SECTION FOR PRINTING IMAGE DATA, PRINTING SYSTEM, AND COMPUTER READABLE MEDIUM

CROSS-REFERENCE TO RELATED APPLICATIONS

This application is based on and claims priority under 35 USC 119 from Japanese Patent Application No. 2009-198252 filed Aug. 28, 2009.

BACKGROUND

Technical Field

The present invention relates to an image processing apparatus, a printing system and a computer readable medium.

SUMMARY

According to an aspect of the invention, there is provided an image processing apparatus including: an input section that inputs image information and additional information; and a generating section that, in case that printing of a mirror image of an image according to the image information and a normal image of an image according to the additional information is instructed, generates printing image information for printing the mirror image of the image according to the image information input from the input section, and the normal image of the image according to the additional information input from the input section.

BRIEF DESCRIPTION OF THE DRAWINGS

An exemplary embodiment of the present invention will be described in detail based on the following figures, wherein.

DETAILED DESCRIPTION

Figure 1:
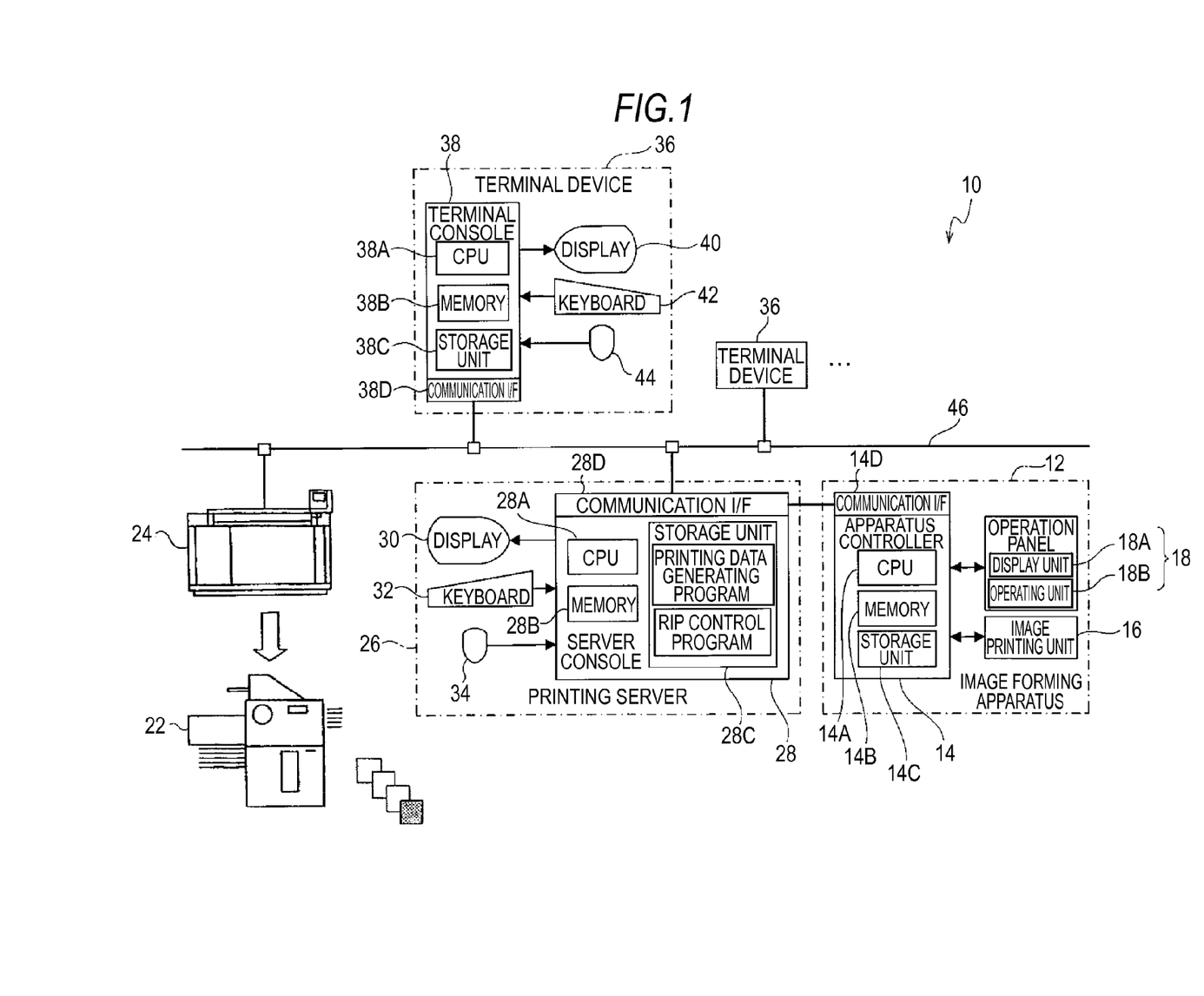
FIG. 1 is a block diagram showing the configuration of a printing system according to an exemplary embodiment of the present invention.

An exemplary embodiment of the present invention will be hereinafter described in detail with reference to drawings. FIG. 1 shows a printing system 10 according to the exemplary embodiment. The printing system 10 includes an image forming apparatus 12 and a CTP (Computer-To-Plate) 24. The image forming apparatus 12 functions as a printer configured to form a visible color image on a recording sheet based on printing image data input thereto through the electro-photographic processing. The CTP 24 is configured to directly produce a printing plate from the input printing image data. The printing plate is used for executing printing in a printing machine (press apparatus) 22. The image forming apparatus 12 is connected to a printing server 26 via a communication line. The printing server 26 is connected to the CTP 24 and plural terminal devices 36 via a communication line 46. The printing system 10 corresponds to an exemplary embodiment of a printing system.

The image forming apparatus 12 is constructed by a microcomputer and the like. The image forming apparatus 12 includes an apparatus controller 14. The apparatus controller 14 accommodates a CPU 14A, a memory 14B, a non-volatile storage unit 14C constructed by an HDD (Hard Disk Drive), a flash memory and the like, and a communication I/F (interface) 14D. The image forming apparatus 12 is connected to the printing server 26 via the communication I/F 14D. Further, an image printing unit 16 and an operation panel 18 are connected to the apparatus controller 14. The image printing unit 16 is configured to print an image expressed by the input printing image data onto a recording sheet. The operation panel 18 is provided with a display unit 18A and an operating unit 18B. The display unit 18A functions as a display section including an LCD and the like. The operating unit 18B functions as an input section including ten keys, a touch panel and the like. The image forming apparatus 12 corresponds to an exemplary embodiment of the printing apparatus.

Figure 2:
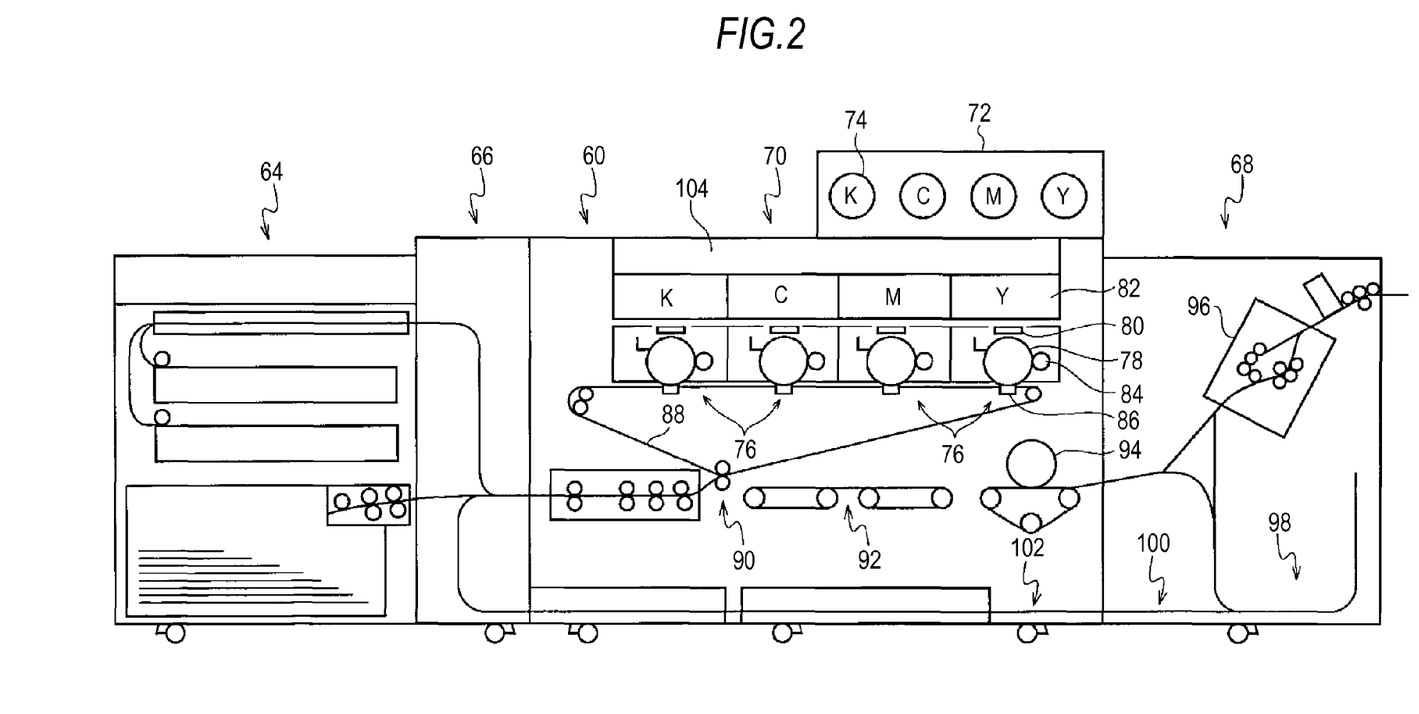
FIG. 2 is a schematic diagram showing the configuration of an image forming apparatus.

As shown in FIG. 2, the image printing unit 16 of the image forming apparatus 12 includes an image forming module 60, an FM (Feeder Module, i.e., sheet-feeding module) 64, a coupling module 66, and an output module 68. The FM 64 is configured to feed a recording sheet to the image forming module 60. The coupling module 66 couples the image forming module 60 and the FM 64. The output module 68 is configured to discharge a recording sheet out of the image forming apparatus 12 after the image forming module 60 forms an image on the recording sheet. The FM 64 may include plural stage units. Further, a finisher (post processing device) module may be provided to the output module 68 as a subsequent stage unit. For example, the finisher module may be a type of finisher module provided with a stapler. In this case, the stapler is configured to execute stacking processing on plural recording sheets and staple them at a corner or two positions of a side of them. Alternatively, the finisher module may be a type of finisher module provided with a punching mechanism. The punching mechanism is configured to pierce at least a punch hole into single or plural recording sheets. In this case, the punch hole/holes is/are used for filing. The finisher module is desirably usable even in an off-line state that the image forming apparatus 12 is not being accessed to other apparatuses via a communication line.

The image forming module 60 includes an image forming core 70 and a toner supplier 72. The toner supplier 72 is loaded with four color toner cartridges 74. The colors are C (Cyan), M (Magenta), Y (Yellow) and K (Black). Further, the image forming core 70 includes four print engines (printing units) 76. The respective printing engines 76 correspond to color components C, M, Y and K. The printing engines 76 are linearly disposed along a circulation direction of an endless intermediate transfer belt 88 (i.e., so called tandem fashion). Each of the print engines 76 is provided with a photoconductor drum 78, an electrifier 80, an optical scanner 82, a developing unit 84, and a primary transfer unit 86. The electrifier 80 electrifies the photoconductor drum 78. The optical scanner 82 forms an electrostatic latent image on the photoconductor drum 78 by scanning the surface of the photoconductor drum 78 with a beam modulated in accordance with printing data of a color component corresponding to the print engine 76. The developing unit 84 forms a toner image by developing the electrostatic latent image formed on the photoconductor drum 78. The primary transfer unit 86 (primarily) transfers the toner image formed on the photoconductor drum 78 onto the intermediate transfer belt 88. The toner images, formed on the respective print engines 76 corresponding to four color components, are superposed on the intermediate transfer belt 88. Accordingly, a color toner image is formed on the intermediate transfer belt 88.

The color toner image, formed on the intermediate transfer belt 88, is (secondarily) transferred, by a secondary transfer unit 90, onto a recording sheet that is transported from the FM 64 at a predetermined timing. After the transference of the color toner image, the recording sheet is transported to a fuser 94 along a transporting path 92. The toner image is melted and fixed on the recording sheet by the fuser 94. The recording sheet is then transported to a sheet discharge processing device 96 of the output module 68 (Alternatively, the recording sheet may be temporarily held on a stacker 98, and may be then transported to the sheet discharge processing device 96). Subsequently, terminal processing is executed on the recording sheet as needed. Finally, the recording sheet is discharged from the apparatus. Further, in executing duplex printing, the recording sheet that the toner image is fixed (i.e., the color image is printed) on one side thereof is fed to the transporting path 92 from the stacker 98 through a reverse path 100 and a reverse transporting path 102 of the image forming module 60 while being reversed. The image forming core 70 is also provided with an electric controller housing 104 that accommodates electric circuits for respectively controlling activation/deactivation of the print engines 76, power circuits for respective modules, and the like.

Detailed description of the CTP 24 will be hereinafter omitted. Simply described, the CTP 24 is configured so that a printing plate (machine plate) of a specific color component is produced by wrapping and fixing a sheet of printing plate on the outer peripheral surface of a cylindrical rotation drum, rotating the cylindrical rotation drum, recording an image on the printing plate by applying a beam onto the printing plate rotating integrally with the cylindrical rotation drum while the beam is modulated in accordance with the input printing data of a specific color component, and developing the printing plate on which the image is recorded. In this case, the aforementioned processing is repeated with respect to color components C, M, Y and K. Accordingly, printing plates, corresponding to four colors, are produced. The respective color component printing plates, produced by the CTP 24, are used for printing while being set in the printing machine 22.

The printing system 10 according to the present exemplary embodiment allows a user to give a printing instruction to each of the image forming apparatus 12 and the CTP 24 through the terminal device 36 online. The printing system 10 also allows the user to select either printing based on the image forming apparatus 12 or printing based on the CTP 24. Here, according to the printing based on the CTP 24, a printing plate is produced by using the CTP 24, and then the produced printing plate is set in the printing machine 22 to execute printing.

On the other hand, in the case of the printing based on the image forming apparatus 12, some works (e.g., production of a printing plate and setting of the produced printing plate in the printing machine) are not required. According to the printing based on the image forming apparatus, the printing has been completed in a short period of time after a printing instruction is made (the printing speed is equal to about 60 sheets per minute). However, the printable size of the recording sheet is restricted (normally set to A3 size or less). Therefore, the image forming apparatus 12 is used to print a relatively small amount of and various kinds of printing media having a predetermined size or less. Before a printing plate is formed by the CTP 24, the image forming apparatus 12 is also used to check an image expressed by the printing image data to be used to produce the printing plate. On the other hand, the CTP 24 spends a relatively long period of time in production of a printing plate (e.g., it takes roughly several minutes to produce a printing plate) and requires a work of setting the produced printing plate in the printing machine. However, once the printing plate is completely set in the printing machine, high-speed printing is possible (e.g., several hundred sheets per minute). Further, a strict restriction is not imposed on the printable size of the printing medium. Therefore, the CTP 24 is used to print large-size printing media and a large amount of and various types of printing media.

On the other hand, the terminal device 36 is provided with a terminal console 38. The terminal console 38 includes a PC (Personal Computer) and the like, and accommodates a CPU 38A, a memory 38B, a non-volatile storage unit 38C such as a HDD, a flash memory or the like, and an communication I/F 38D. The terminal console 38 is connected to the communication line 46 via the communication I/F 38D. Further, a display 40, a keyboard 42 and a mouse 44 are connected to the terminal console 38 of the terminal device 36. An OS (Operating System) and an application software for creating a printing-target document are installed in the storage unit 38C of the terminal device 36.

In the present exemplary embodiment, a user creates a print-target document using the application software through the operation of the terminal device 36. The document may include a character/characters, an image/images (e.g., photograph, drawing and chart) or the like. Alternatively, the document is constructed by a combination of a character/characters and an image/images. When the print-target document is created, a user executes an instructing operation of printing the print-target document. Various parameters are specified to determine a printing condition throughout the instruction operation. For example, the printing condition includes the type of an apparatus that executes printing (i.e., either the image forming apparatus 12 or the CTP 24), the number of printed media, the size of the printing medium, and sheet quality. Further, the printing condition includes parameters as to whether or not a mirror printing described later should be executed and whether or not printing of additional information should be executed. When a user executes the instruction operation, print control information is produced and transmitted from the terminal device 36 to the printing server 26 together with the PDL (Page Description Language)-based printing data of the print-target document. The print control information herein includes the printing condition set by a user, which are written in a predetermined format such as JDF (Job Definition Format).

Next, the printing server 26 will be described. The printing server 26 is provided with a server console 28. The server console 28 accommodates a CPU 28A, a memory 28B, a non-volatile storage 28C constructed by a HDD, a flash memory and the like, and a communication I/F 28D. The server console is connected to the communication line 46 via the communication I/F 28D. Further, a display 30, a keyboard 32 and a mouse 34 are connected to the server console 28. A printing data generating program and a RIP control program are installed in the storage unit 28C of the printing server 26. The printing data generating program causes the printing server 26 to function as a printing image data generator 50 described later (see FIG. 3). The RIP control program causes the printing server 26 to function as a RIP controller 48 described later (see FIG. 3). In other words, the RIP control program causes the CPU 28A to executes a RIP control processing described later. The RIP control program as well as the print data generating program implements an image processing method.

The printing server 26 functions as the image processing apparatus according to the exemplary embodiment of the invention when the CPU 28A of the printing server 26 runs the RIP control program and the printing data generating program.

Figure 3:
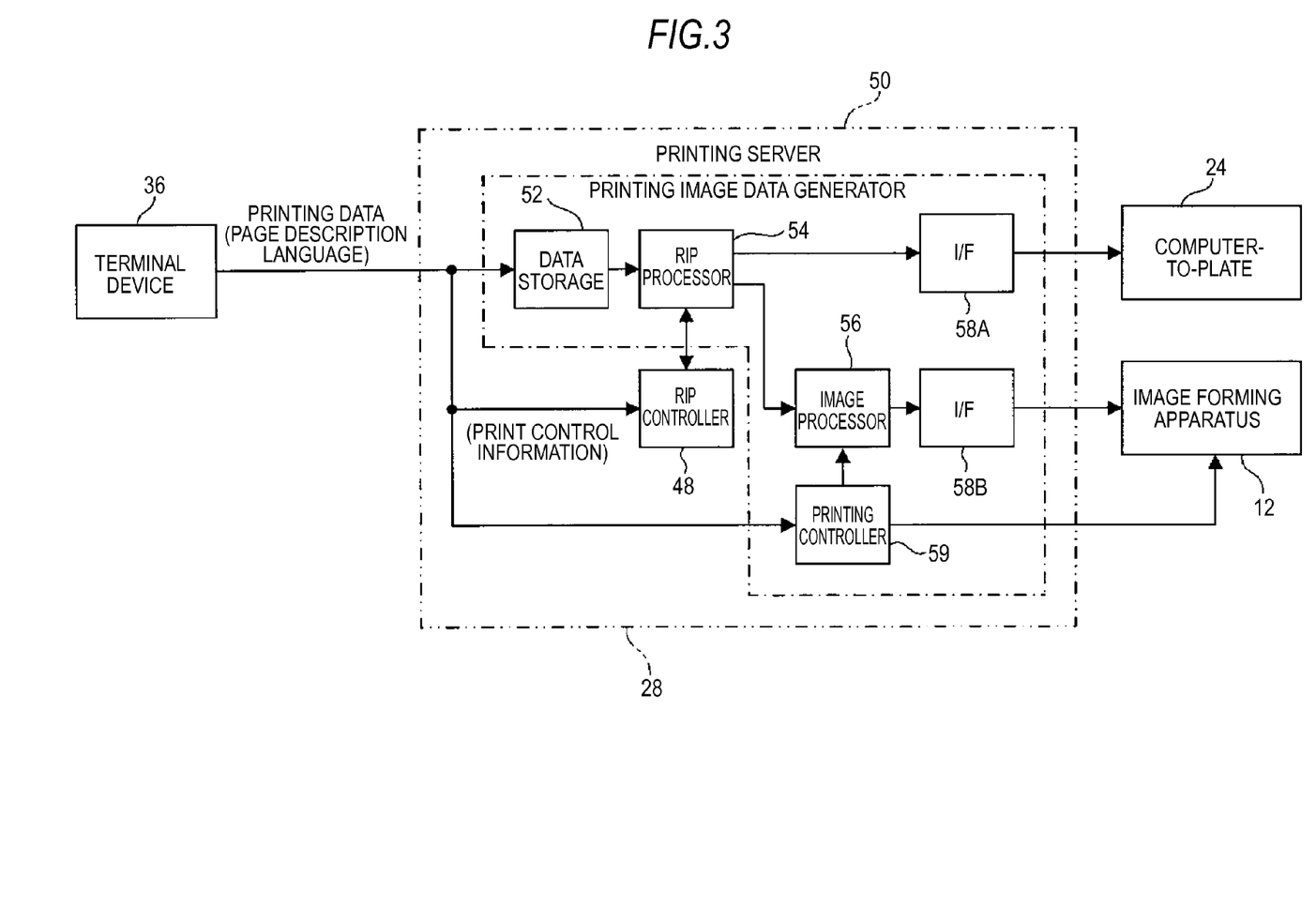
FIG. 3 is a functional block diagram of a printing server.

The printing image data generator 50 is implemented when the CPU 28A of the printing server 26 runs the printing data generating program. As shown in FIG. 3, the printing image data generator 50 includes a data storage unit 52, a RIP processor 54, an image processor 56, an I/F (interface) 58A, an IF (interface) 58B, and a printing controller 59. The data storage unit 52 sequentially stores plural printing data (described in PDL) that the printing server 26 receives from the terminal device 36. Further, a so-called RIP engine is incorporated in the RIP processor 54. The RIP engine is a decomposer functioning as a PDL interpreter and an imager. The RIP processor 54 executes RIP (Raster Image Process) processing for generating printing data usable when either the image forming apparatus 12 or the CTP 24 executes printing. Specifically, the RIP processor 54 extracts from the data storage 52 the printing data which are received from the terminal device 36 together with the print control information, and interprets the printing data. The RIP processor 54 then executes color conversion (e.g., from R, G, B to C, M, Y, K) and decompression into a raster image data (bitmap data) per page of document. Thus, the RIP processor 54 corresponds to a drawing section.

It is general that the printing image data input into the image forming apparatus 12 when an image is printed in the image forming apparatus 12 are multi-valued/low-resolution image data that are relatively low in resolution (e.g., 600 dpi) and expressed in gradation by plural bits (for example, 8 bits) per pixel with respect to each of C, M, Y and K. On the other hand, the printing image data input into the CTP 24 when an image is printed (a printing plate is created) in the CTP 24 are binary/high-resolution image data that are relatively high in resolution (e.g., 2400 dpi) and expressed in gradation by one bit (gradation is expressed by plural dots) per pixel (dot) with respect to each of C, M, Y and K. Therefore, there is a difference between the formats of the printing image data input into both the image forming apparatus 12 and the CTP 24.

Accordingly, the RIP processor 54 refers to the print control information to recognize the type of the apparatus that is caused to execute printing, and generates the printing image data (raster image data) having a format matched with the recognized apparatus type from the printing data described by PDL. The format of the printing image data to be generated by the RIP engine of the RIP processor 54 may be specified on the basis of the print control information. In this case, the binary/high-resolution format may be specified as the format of the printing image data for causing the image forming apparatus 12 to execute printing of an image (e.g., when a user wants to check an image expressed by the printing image data to produce a printing plate as described below).

Further, the RIP processor 54 determines a printing condition by referring to the print control information corresponding to the printing data taken out from the data storage unit 52, and executes necessary image processing as well as the RIP processing based on the determined printing condition. In this case, for example, the necessary image processing includes image reversing processing and information adding processing. In the reversing processing, an image expressed by printing image data is reversed in the right-and-left direction or in the up-and-down direction when "mirror image printing" is specified as a printing condition. In the information adding processing, an image representing additional information specified in advance is added to the printing image data when "additional information printing" is specified as a printing condition. The image reversing processing and the information adding processing described above are executed under the control of the RIP controller 48. These processing will be described later.

Further, when the image forming apparatus 12 is caused to execute printing, image processing to be possibly simultaneously executed together with the RIP processing includes rotation, arrangement of images of plural pages on a sheet, repeat processing, sheet size matching, CMS (Color Management System) processing for correcting a difference between devices, resolution conversion, and contract adjustment, for instance. On the other hand, when the CTP 24 is caused to execute printing, the image processing to be possibly simultaneously executed together with the RIP processing includes screen processing, imposition for arranging images of plural pages on a large-size printing surface corresponding to a large-size recording sheet, for instance.

When the CTP 24 is caused to execute printing, the RIP processor 54 outputs the printing image data obtained through the aforementioned processing to the I/F 58A. In this case, plural printing image data are sequentially transferred to the CTP 24 via the I/F 58A, and are used for the printing based on the CTP 24 (i.e., the production of a printing plate). On the other hand, when the image forming apparatus 12 is caused to execute printing, the RIP processor 54 outputs the printing image data obtained through the aforementioned processing to the image processor 56. Further, the printing controller 59 determines the printing condition by referring to the print control information that corresponds to the printing image data outputted to the image processor 56 from the RIP processor 54. Then, the printing controller 59 controls the operation of the image processor 56 in accordance with the determined printing condition.

In other words, the image processor 56 has a function of executing various kinds of processing on the input printing image data. The various kinds of processing include rotation of an image, adjustment of a position of an image on a sheet, and enlargement/reduction of an image. The printing controller 59 causes the image processor 56 to execute various kinds of processing in accordance with a sheet discharging condition set in the print control information and the structure and characteristic of the image forming apparatus 12 which is caused to execute printing. The contents of the various kinds of processing are changed in accordance with the structure and characteristic of the image forming apparatus 12, and include sorting of pages in the ascending/descending order, determination of the page printing order in duplex printing, calibration processing (e.g., color conversion, gray balance correction and color blurring correction using multi-dimensional look-up table), screen specifying processing, rearrangement of page (guarantee of positions for stapling and punching) corresponding to finishing processing to be executed by the finisher module of the image forming apparatus 12, collation, and alignment of a discharge side (top and bottom).

After the various kinds of processing are executed on the printing image data in the image processor 56, the printing image data are transferred to the image forming apparatus 12 via the I/F 58B. Further, when the image data is transferred, the printing controller 59 transmits various control commands to the image forming apparatus 12 at the timing synchronized with the processing speed of (each print engine 76 of) the image forming core 70 of the image forming apparatus 12 to control the operations of the respective parts of the image forming apparatus 12 such as the print engines 76, the fuser 94 and the finisher module. Accordingly, the image forming apparatus 12 is caused to execute printing processing. Further, the printing controller 59 executes recovery processing in sheet jam. The content of the recovery processing is changed in accordance with the structure and feature of the image forming apparatus 12. Thus, the printing controller 59 also functions as a printer controller for controlling the operation of the image forming apparatus 12.

Next, an operation of specifying a printing condition by a user before the user instructs printing of a print-target document through the terminal device 36 will be described as an action of this exemplary embodiment.

Figure 4A:
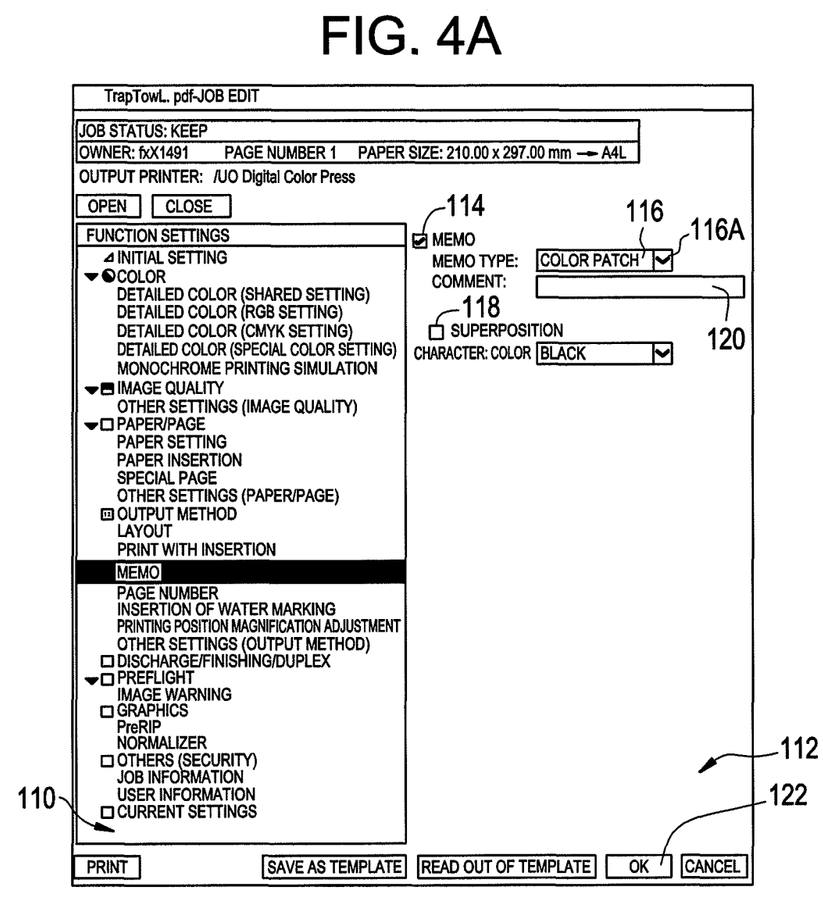
FIG. 4 is an example image of a print condition specifying screen.

When the user specifies a printing condition, a printing condition specifying screen is displayed on a display 40 as shown in FIG. 4A. On the printing condition specifying screen, items for the printing condition are displayed as a list within a window 110 disposed on the left end of the printing condition specifying screen. The user is allowed to specify a desired one of the printing condition items through the printing condition specifying screen. When the user selects a desired item from the printing condition items displayed as the list in the window 110 while operating the mouse 44 and the like, a setting screen of the selected item is displayed in a display area 112 at the right side of the window 110. FIG. 4A shows the setting screen displayed in the display area 112 when "MEMO" (additional information printing) is selected from the printing condition items displayed as the list in the window 110.

The aforementioned additional information printing (MEMO) is a function of printing a character string (s) and/or an image (s) specified by the user in a margin area as additional information. The margin area is an area out of an image printing area on a recording medium in which an image expressed by the printing data is printed.

Particularly when a printing plate is produced by the CTP 24, printing of additional information is frequently used. For example, a character string(s) (e.g., a comprehensive layout number and a comment) is printed on a margin area as additional information (a printing plate having the character string (s) added to the margin area is produced), thereby using the character string (s) for the management of printing plates.

Further, an image(s) (e.g., color patch or the like) is/are printed on the margin area as additional information (a printing plate having a color patch added to the margin area is produced), thereby using the color patch for checking a color in the printing using a printing plate having a color patch created thereon.

When printing is executed by the image forming apparatus 12, a character string(s) (e.g., information on a print-target document, a profile name or the like) is also printed on the margin area as additional information, thereby using the character string (s) in various applications such as management of a printing result.

Figure 4B:
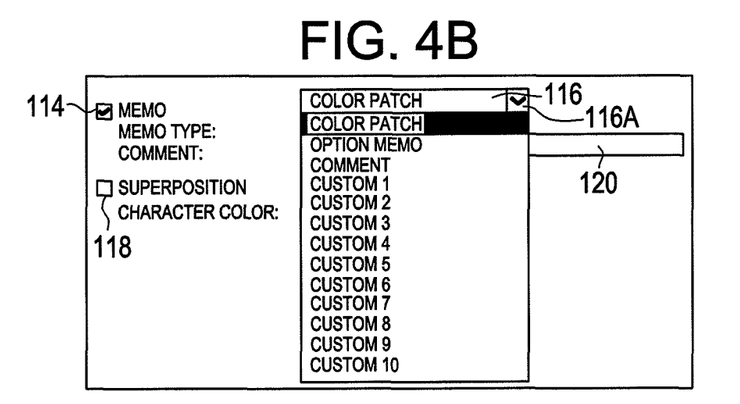

As shown in FIG. 4A, the setting screen for printing additional information is provided with a check box 114, a pull-down field 116, and a check box 118. The check box 114 is used to determine whether or not additional information (MEMO) should be printed. The pull-down field 116 is used to choose the type of additional information (i.e., the type of MEMO) to be printed. The check box 118 is used to determine whether overwriting is executed (i.e., additional information is printed so as to be superposed on the image expressed by the printing data) or not. Further, the pull-down field 116 is provided with a diagram 116A for instructing display of a list of the additional information selectable as a printing target. When the user selects the diagram 116A, additional information selectable as a printing target is displayed as a list as shown in FIG. 4B. Additionally, the additional information displayed as a list includes "COMMENT". When a user chooses the "COMMENT", he/she is allowed to input a desired comment (s) into an input field 120 disposed within the setting screen as the additional information.

The user selects a box 122 which is represented by "OK" and disposed within the setting screen when the user completes the specifying operation for printing of additional information by selecting printing or non-printing of additional information through the check box 114, selecting print-target additional information through the pull-down field 116 (while inputting a desired character string(s) into the input field 120 as needed), and selecting overwriting or non-overwriting through the check box 118. Upon execution of this operation as a trigger, the print control information is added with information representing various kinds of user's specifications regarding the additional information printing.

A condition "presence or absence of mirror image printing" (not shown) is also included in the printing condition that a user is allowed to specify through the printing condition setting screen. The mirror printing is a function of printing a reverse image corresponding to a mirror image of the image expressed by the printing data. The mirror printing is normally selected when the CTP 24 is caused to produce a printing plate. However, even in the printing based on the image forming apparatus 12, the mirror printing is also selected in a case where it is required that transfer sheet is selected as a recording medium on which an image is printed and when an image which is once printed on the transfer sheet is transferred onto a transfer target, the thus-transferred image on the transfer target is set as a normal image (i.e., an image whose orientation is the same as the image expressed by the original printing data).

Figure 5:
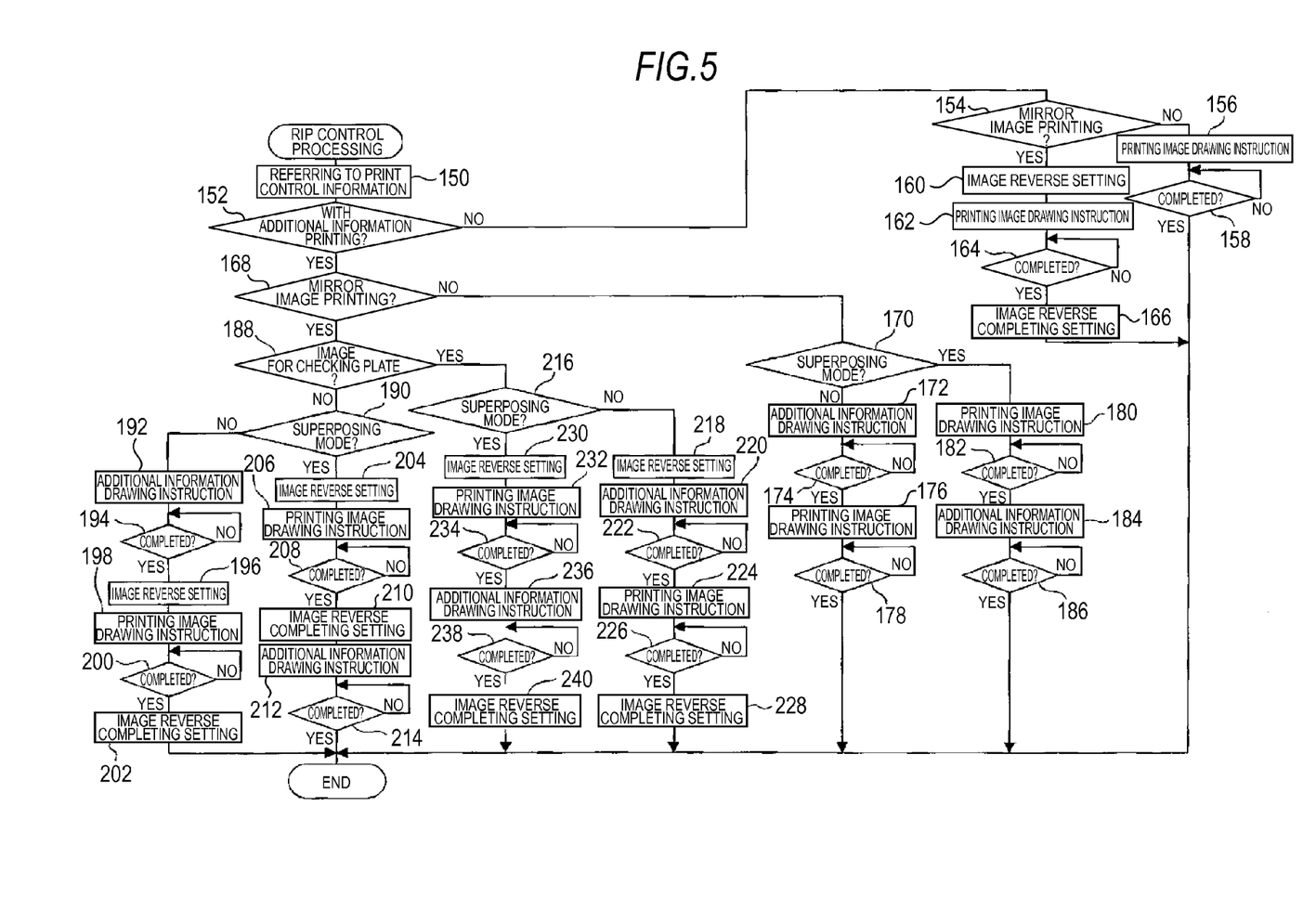
FIG. 5 is a flowchart of the contents of RIP control processing.

Next, the RIP control processing to be executed by the printing server 26 will be described hereunder with reference to FIG. 5.

The RIP control processing is executed in parallel to the aforementioned RIP processing when the CPU 28A of the printing server 26 runs a printing data generating program and further runs a RIP control program every time the RIP processor 54 executes the RIP processing corresponding to the printing data for the image forming apparatus 12 which is specified as an apparatus executing printing. The RIP control processing is the processing corresponding to an example of a specifying section.

The printing server 26 which executes the RIP control processing corresponds to an example of the specifying section. The printing server 26 also functions as the drawing section as described above. Therefore, the printing server 26 corresponds to an example of a generating section according to the present exemplary embodiment of the invention.

According to the RIP control processing, in Step 150, print control information corresponding to printing data on which the RIP processor 54 executes the RIP processing is first referred to, and a printing condition set for the printing data is recognized. Subsequently, in Step 152, it is determined whether or not additional information printing is instructed based on the printing condition recognized in Step 150. When the determination step results in "No", the processing proceeds to Step 154. In Step 154, whether or not mirror printing is instructed is determined based on the printing condition recognized in Step 150. When the determination step also results in "No", the processing proceeds to Step 156. In Step 156, the RIP engine incorporated in the RIP processor 54 is instructed to draw the image expressed by the printing data.

Accordingly, the RIP engine of the RIP processor 54 executes processing of generating bitmap printing image data by interpreting the PDL-based printing data, executing color conversion (e.g., from R, G and B to C, M, Y and K), and drawing an image into the memory 28B, sequentially. Subsequently, in Step 158, it is determined whether or not generation of the printing image data is completed. The determination in Step 158 is repeated until the determination results in "Yes". When the RIP engine completes creation of the printing image data, the determination of Step 158 results in "Yes". Accordingly, the RIP control processing is completed. In the aforementioned Steps 156, 158, the printing image data for printing a normal image of the image expressed by the printing data is generated.

Further, when the determination in Step 154 results in "Yes" (when the additional information printing is not instructed, but the mirror printing is instructed), the processing proceeds to Step 160. In Step 160, the RIP engine is instructed to reverse an image to be subsequently drawn in the right-and-left direction or in the up-and-down direction. The instruction is executed by giving the RIP engine a command (i.e., PDL-based command) for switching settings of the origin and the coordinate system of the image to be subsequently drawn so that the image to be drawn is reversed. With the configuration, as in the case that the aforementioned command is described in the printing data, an image to be subsequently drawn by the RIP engine will be reversed in the right-and-left direction or in the up-and-down direction.

In Step 162, the RIP engine is instructed to draw the image expressed by the printing data. Subsequently, in Step 164, it is determined whether or not generation of the printing image data is completed. The determination in Step 164 is repeated until the determination results in "Yes". When the RIP engine completes generation of the printing image data, the determination in Step 164 results in "Yes". Then, the processing proceeds to Step 166. In Step 166, the settings of the origin and the coordinate system of the image which are changed in the preceding Step 160 are restored, and the RIP control processing is subsequently completed. In the aforementioned Steps 160 to 166, the printing image data for printing a mirror image of the image expressed by the printing data is generated.

Here, returning to Step 152, when the determination in Step 152 results in "Yes" (when the additional information printing is instructed), the processing proceeds to Step 168. In Step 168, whether or not the mirror printing is instructed is determined based on the printing condition recognized in Step 150. When the determination in Step 168 results in "No", the processing proceeds to Step 170. In Step 170, whether or not superposition of the additional information image is instructed is determined based on the printing condition recognized in Step 150. When the determination in Step 170 results in "No" (when it is instructed to add the additional information image to the normal image of the image expressed by the printing data without superposing (overwriting) the additional information image on the normal image), the processing proceeds to Step 172. In Step 172, the RIP engine is given the additional information specified by a user as the PDL-based data. Thus, the RIP engine is instructed to draw the image expressed by the additional information. With this configuration, the RIP engine draws the image of additional information specified by the user on the memory 28B.

Subsequently, in Step 174, it is determined whether or not drawing of the additional information image is completed. The determination in Step 174 is repeated until the determination results in "Yes". When the drawing of the additional information image is completed, the determination in Step 174 results in "Yes". Then, the processing proceeds to Step 176. In Step 176, the RIP engine is instructed to draw the image expressed by the printing data. Here, the additional information image is drawn before the image expressed by the printing data is drawn. Therefore, when the additional information image includes a portion overlapping with the image expressed by the printing data, the image expressed by the printing data is superposed on the overlapping portion. Subsequently, in Step 178, it is determined whether or not drawing of the image expressed by the printing data is completed. The determination in Step 178 is repeated until the determination results in "Yes". When the drawing of the image expressed by the printing data is completed, the determination in Step 178 results in "Yes". Then, the RIP control processing is completed. In the aforementioned Steps 172 to 178, the printing image data is generated, which is used for printing the image obtained by adding the additional information image to the normal image of the image expressed by the printing data without superposing the additional information image on the normal image.

Here, returning to Step 170, when the determination in Step 170 results in "Yes" (when it is instructed to add the additional information image to the normal image of the image expressed by the printing data), the processing proceeds to Step 180. In Step 180, the RIP engine is instructed to draw the image expressed by the printing data. Subsequently, in Step 182, it is determined whether or not the drawing of the image expressed by the printing data is completed. The determination in Step 182 is repeated until the determination results in "Yes". When the drawing of the image expressed by the printing data is completed, the determination in Step 182 results in "Yes". Then, the processing proceeds to Step 184. In Step 184, the RIP engine is given additional information specified by a user as the PDL-based data. Thus, the RIP engine is instructed to draw the image expressed by the PDL-based data. In this case, the image expressed by the printing data is drawn before the additional information image is drawn. Therefore, when the image expressed by the printing data includes a portion overlapping with the additional information image, the additional information image is superposed on the overlapping portion. Subsequently, in Step 186, it is determined whether or not the drawing of the additional information image is completed. The determination in Step 186 is repeated until the determination results in "Yes". When the drawing of the additional information image is completed, the determination in Step 186 results in "Yes". Then, the RIP control processing is completed. In the aforementioned Steps 180 to 186, the printing image data is generated, which is used for printing the image obtained by adding the additional information image to the normal image of the image expressed by the printing data while the additional information image is superposed on the normal image.

Here, returning to Step 168, when the determination in Step 168 results in "Yes" (when both the additional information printing and the mirror image printing are instructed), the processing proceeds to Step 188. In Step 188, it is determined whether or not the image expressed by the printing data is an image for producing a printing plate and the current printing aims at checking the image expressed by the printing image data to be used for producing the printing plate. For example, the determination in Step 188 is executed by determining whether or not the binary/high-resolution format is specified in the print control information as the format of the printing image data to be generated by the RIP engine. The determination in Step 188 corresponds to determination as to whether or not "the input image information is image information for expressing an original plate to be used for producing a printing plate" in the second aspect of the present invention. When the determination in Step 188 results in "No", the processing proceeds to Step 190. In Step 190, whether or not superposition of the additional information image is instructed is determined based on the printing conditions recognized in Step 150.

When the determination in Step 190 results in "No" (when the image expressed by the printing data is not an image for producing a printing plate and addition of the additional information image to a mirror image of the image expressed by the printing data without superposition is instructed), the processing proceeds to Step 192. In Step 192, the RIP engine is instructed to draw the image of additional information specified by the user. In this case, the RIP engine draws a normal image of the additional information image on the memory 28B.

Subsequently, in Step 194, it is determined whether or not the drawing of the additional information image is completed. The determination in Step 194 is repeated until the determination results in "Yes". When the drawing of the additional information image is completed, the determination in Step 194 results in "Yes". Then, the processing proceeds to Step 196. In Step 196, as in the case of the aforementioned Step 160, the RIP engine is instructed to reverse an image to be subsequently drawn in the right-and-left direction or in the up-and-down direction.

Figure 6:
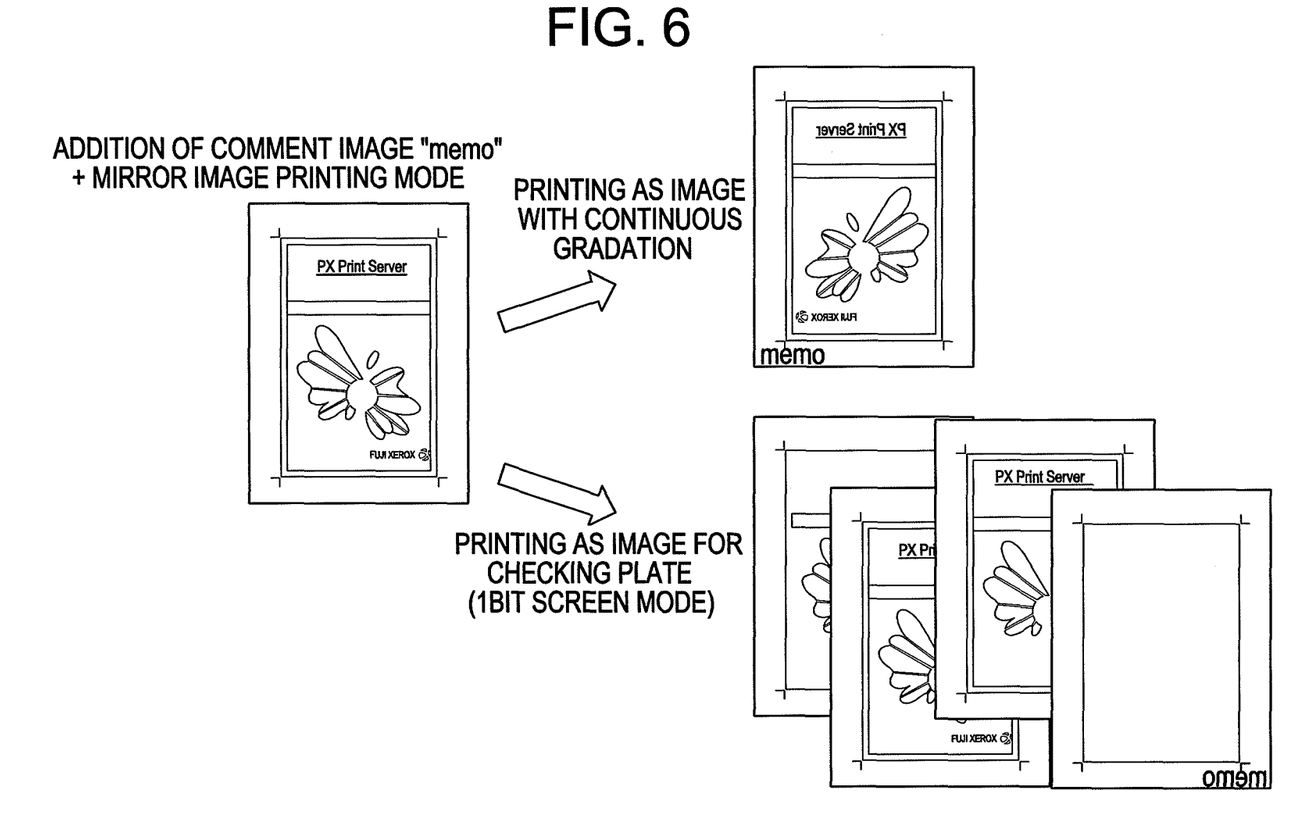
FIG. 6 is an example image displayed based on printing image data to be generated in a mirror image printing mode.

Subsequently, in Step 198, the RIP engine is instructed to draw the image expressed by the printing data. In this case, the RIP engine draws a mirror image of the image expressed by the printing data on the memory 28B. Subsequently, in Step 200, it is determined whether or not the drawing of the image expressed by the printing data is completed. The determination in Step 200 is repeated until the determination results in "Yes". When the drawing of the image expressed by the printing data is completed, the determination in Step 200 results in "Yes". Then, the processing proceeds to Step 202. In Step 202, the settings of the origin and the coordinate system of the image which are changed in the aforementioned Step 196 are restored. Then, the RIP control processing is completed. In the aforementioned Steps 192 to 202, the printing image data is generated, which is used for printing the image obtained by adding a normal image of the additional information image to a mirror image of the image expressed by the printing data without superposing the normal image on the mirror image. Therefore, when printing is executed on a recording sheet by using the printing image data, the image expressed by the printing data is printed as a mirror image in response to a user's instruction while the additional information image is printed as a normal image. FIG. 6 shows this as an image with a caption "PRINTING AS IMAGE WITH CONTINUOUS GRADATION".

Here, returning to Step 190, when the determination in Step 190 results in "Yes" (when the image expressed by the printing data is not an image for producing a printing plate and it is instructed to add the additional information image to a mirror image of the image expressed by the printing data while the additional information image is superposed on the mirror image), the processing proceeds to Step 204. In Step 204, as in the case of the aforementioned Step 160, the RIP engine is instructed to reverse an image to be subsequently drawn in the right-and-left direction or in the up-and-down direction. Subsequently, in Step 206, the RIP engine is instructed to draw the image expressed by the printing data. In this case, the RIP engine draws a mirror image of the image expressed by the printing data on the memory 28B. Subsequently, in Step 208, it is determined whether or not the drawing of the image expressed by the printing data is completed. The determination in Step 208 is repeated until the determination results in "Yes". When the drawing of the image expressed by the printing data is completed, the determination in Step 208 results in "Yes". The processing proceeds to Step 210. In Step 210, the settings of the origin and the coordinate system of the image which are changed in the aforementioned Step 204 are restored.

Subsequently, in Step 212, the RIP engine is instructed to draw the image of additional information specified by the user. In this case, the RIP engine draws a normal image of the additional information image on the memory 28B. Subsequently, in Step 202, it is determined whether or not the drawing of the additional information image is completed. The determination in Step 202 is repeated until the determination results in "Yes". When drawing of the additional information image is completed, the determination in Step 202 results in "Yes". Then, the RIP control processing is completed. In the aforementioned Steps 204 to 214, the printing image data is generated, which is used for printing the image obtained by adding a normal image of the additional information image to a mirror image of the image expressed by the printing data while the normal image is superposed on the mirror image. Therefore, when printing is executed on a recording sheet by using the printing image data, the image expressed by the printing data is printed as the mirror image in response to a user's instruction while the additional information image is printed as the normal image, as in the case of the printing image data to be generated in the aforementioned Steps 192 to 202. FIG. 6 shows this as an example image having the caption "PRINTING AS IMAGE WITH CONTINUOUS GRADATION".

Here, returning to Step 188, when the determination in Step 188 results in "Yes" (when the image expressed by the printing data is an image for producing a printing plate), the processing proceeds to Step 216. In Step 216, it is determined whether or not superposition of the additional information image is instructed based on the printing condition recognized in Step 150. When the determination in Step 216 results in "No" (when the image expressed by the printing data is an image for producing a printing plate and addition of the additional information image to a mirror image of the image expressed by the printing data without superposition), the processing proceeds to Step 218. Then, processing in Steps 218 to 228 is executed. Steps 218 to 228 are different from the aforementioned Steps 192 to 202 only in that the RIP engine is instructed to reverse an image to be subsequently drawn in the right-and-left direction or in the up-and-down direction (Step 218) before drawing the additional information image is instructed (i.e., prior to execution of Step 220). More specifically, Steps 218 to 228 are different from the aforementioned Steps 192 to 202 in that the RIP engine generates the printing image data with the binary/high-resolution format. In Steps 218 to 228, the RIP engine draws a mirror image of the additional information image on the memory 28B.

In Steps 218 to 228, the printing image data is generated, which is used for printing the image obtained by adding a mirror image of the additional information image to a mirror image of the image expressed by the printing data without superposing the mirror image of the additional information image on the mirror image of the image expressed by the printing data. When printing is executed on a recording sheet by using the printing image data, the image expressed by the printing data is printed as a mirror image in response to a user's instruction while the additional information image is printed as a mirror image. FIG. 6 shows this as example images having a caption "PRINTING AS IMAGE FOR CHECKING PLATE".

Here, returning to Step 216, when the determination in Step 216 results in "Yes" (when the image expressed by the printing data is an image for producing a printing plate and it is instructed to add the additional information image to a mirror image of the image expressed by the printing data while the additional information image is superposed on the mirror image), the processing proceeds to Step 230. Then, Steps 230 to 240 are executed. Steps 230 to 240 are different from the aforementioned Steps 204 to 214 only in that the RIP engine is instructed to restore the settings of the origin and the coordinate system of the image, which are changed for reversing an image to be drawn (Step 240) after the RIP engine completes drawing the additional information image (i.e., after the determination in Step 238 results in "Yes"). More specifically, Steps 230 to 240 are also different from the aforementioned Steps 204 to 214 in that the RIP engine generates the printing image data with the binary/high-resolution format. In Step 230 to 240, the RIP engine draws a mirror image of the additional information image in the memory 28B.

Therefore, in Steps 230 to 240, the printing image data is generated, which is used for printing the image obtained by adding the mirror image of the additional information image to the mirror image of the image expressed by the printing data while the mirror image of the additional information image is superposed on the mirror image of the image expressed by the printing data. When printing is executed on a recording sheet by using the printing image data, the image expressed by the printing data is printed as a mirror image in response to a user's instruction while the additional information image is also printed as a mirror image, as in the case of the printing image data to be generated in the aforementioned Steps 218 to 228. FIG. 6 shows this as an example image having the caption "PRINTING AS IMAGE FOR CHECKING PLATE".

In the exemplary embodiment described above, the printing image data is generated in parallel to execution of the RIP processing by the RIP engine of the RIP processor 54, and specifically, the printing image data is generated in accordance with the printing condition expressed by the print control information (i.e., "printing or non-printing of additional information", "printing or non-printing of mirror image", "superposition of additional information image or not" and "whether or not the image expressed by printing data is an image for producing a printing plate"). In this case, the printing image data is generated by controlling whether an additional information image should be drawn or not and the drawing timing of the additional information image (i.e., whether the additional information image is drawn before or after the drawing of the image expressed by the printing data), and whether the setting of reversing an image to be drawn should be executed or not, whether the setting of restoring the setting of reversing the image to be drawn should be executed or not, and the timing of executing each of the respective settings.

The exemplary embodiment of the present invention is not limited to this exemplary embodiment. For example, the printing image data may be generated in accordance with the printing condition by causing the RIP engine to draw a normal image or a mirror image of the image expressed by the printing data in accordance with the condition "printing or non-printing of the mirror image", causing the RIP engine to draw a normal image or a mirror image of the additional information image in accordance with the condition "printing or non-printing of the mirror image" and "whether or not the image expressed by the printing data is an image for producing a printing plate" when additional information printing is instructed (i.e., the RIP engine is caused to draw the mirror image of the additional information image when the image expressed by the printing data is not an image for producing a printing plate and the mirror image printing is instructed or to draw the normal image of the additional information image in the other cases), and combining the both images drawn by the RIP engine in accordance with the condition "superposition or non-superposition of the additional information image" (i.e., the both images are combined so that the additional information image can be superposed on the image expressed by the printing data when "superposition of the additional information image" is selected, however, the both images are combined so that the image expressed by the printing data can be superposed on the additional information image when "non-superposition of the additional information image" is selected).

Further, in the foregoing description, the printing system 10 as an example of the printing system according to the exemplary embodiment of the present invention is configured so that CTP 24 is also connected to the communication line 46 and the printing server 26 also generates the printing image data to be used for the printing based on the CTP 24 (i.e., production of a printing plate). However, the printing system is not limited to this style. For example, the printing system 10 may not be provided with the CTP 24 and the printing server 26 may be configured to generate only the printing image data to be used for the printing based on the image forming apparatus 12. Further, the printing apparatus may not be configured to print an image according to the electro-photographic method adopted by the image forming apparatus 12. For example, the printing apparatus may be configured to print an image by other methods such as inkjet printing.

Further, in the foregoing description, the printing server 26 is configured to function as the image processing apparatus according to the exemplary embodiment of the present invention. However, the image processing apparatus is not limited to this style. For example, the image forming apparatus 12 (an apparatus functioning as the printing apparatus) may be configured to function as the image processing apparatus according to the exemplary embodiment of the present invention. Alternatively, the terminal device 36 may be configured to function as the image processing apparatus according to the exemplary embodiment of the present invention.

Further, in the foregoing description, the RIP control program and the printing data generating program, both of which correspond to the image processing program according to the present exemplary embodiment, are stored (installed) in the storage unit 28C of the printing server 26 in advance. However, the image processing program according to the exemplary embodiment of the present invention may be provided so as to be stored in a recording medium (e.g., CD-ROM and DVD-ROM).

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The exemplary embodiment was chosen and described in order to best explain the skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
an input section that inputs image information, additional information, and printing conditions indicating mirror printing is instructed;

a determining section that determines whether the mirror printing is for producing a printing plate;
a generating section that generates a mirror RIP image of the image information and generates RIP additional information based on a result of the determination,
wherein the RIP additional information is a mirror RIP image in response to determining that the mirror printing is for producing the printing plate, and
wherein the RIP additional information is a normal RIP image in response to determining that the mirror printing is not for producing the printing plate.

2. The image processing apparatus according to claim 1, wherein the generating section comprises:
a drawing section that draws an image in a bitmap format in a memory by sequentially interpreting a plurality of pieces of the image information, input from the input section, which is described in a page description language, and
an instruction section that instructs the drawing section to reverse an image to be subsequently drawn before the drawing section draws an image, which is subject to be reversed, selected from the image according to the image information and the image according to the additional information, and instructs the drawing section to finish reversing of the image to be subsequently drawn after the drawing section finishes drawing of the image which is subject to be reversed.

3. The image processing apparatus according to claim 1, wherein the additional information is an image, and the image is a color patch printed in a margin area.

4. The image processing apparatus according to claim 1, wherein the additional information is a character string, and the character string is information on a print-target document.

5. The image processing apparatus according to claim 1, wherein the additional information is a character string, and the character string is a profile name.

6. The image processing apparatus according to claim 1, further comprising:
a second determining section that determines if a superposing mode is instructed.

7. The image processing apparatus according to claim 6, further comprising:
a controlling section that controls an order of generating RIP image of the image information and the additional information based on a result of the determination of the second determining section.

8. The image processing apparatus according to claim 7, wherein the controlling section controls the order such that the RIP image of the image information is generated before the additional information is generated in response to determining that the superposed mode is instructed.

9. A printing system, comprising:
the image processing apparatus according to claim 1; and
a printing apparatus that prints an image according to the generated mirror RIP image of the image information and the generated RIP additional information of the image processing apparatus on a recording medium.

10. A non-transitory computer readable medium storing a program causing a computer to execute a process for processing an image, the process comprising:
inputting image information, additional information, and printing conditions indicating mirror printing is instructed; and
determining whether the mirror printing is for producing a printing plate or not;
generating a mirror RIP image of the image information and generating RIP additional information based on a result of the determination,
wherein the RIP additional information is a mirror RIP image in response to determining that the mirror printing is for producing the printing plate, and
wherein the RIP additional information is a normal RIP image in response to determining that the mirror printing is not for producing the printing plate.

* * * * *